(12) United States Patent
Mihm et al.

(10) Patent No.: US 9,415,739 B2
(45) Date of Patent: Aug. 16, 2016

(54) MOUNTING DEVICE FOR AN AIRBAG MODULE

(71) Applicant: TK Holdings Inc., Auburn Hills, MI (US)

(72) Inventors: Russell Joseph Mihm, Beverly Hills, MI (US); Richard Andrew Wiik, Oakland, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 14/692,295

(22) Filed: Apr. 21, 2015

(65) Prior Publication Data

US 2015/0298639 A1 Oct. 22, 2015

Related U.S. Application Data

(60) Provisional application No. 61/982,591, filed on Apr. 22, 2014.

(51) Int. Cl.
*B60R 21/16* (2006.01)
*B60R 21/207* (2006.01)

(52) U.S. Cl.
CPC .................... *B60R 21/207* (2013.01)

(58) Field of Classification Search
CPC .................. B60R 21/207; B60R 2021/23146; B60R 21/18
USPC ............................................ 280/728.2, 730.2
See application file for complete search history.

(56) References Cited

U.S. PATENT DOCUMENTS

| | | | | |
|---|---|---|---|---|
| 5,860,673 A | * | 1/1999 | Hasegawa ............. | B60R 21/207 280/728.3 |
| 5,897,134 A | * | 4/1999 | Stein ..................... | B60R 21/207 280/728.2 |
| 5,938,232 A | * | 8/1999 | Kalandek ............. | B60R 21/207 280/728.3 |
| 5,975,565 A | * | 11/1999 | Cuevas ................. | B60N 2/433 280/728.2 |
| 6,220,624 B1 | | 4/2001 | Abraham et al. | |
| 8,573,635 B2 | * | 11/2013 | Festag .................. | B60R 21/207 280/730.2 |

(Continued)

FOREIGN PATENT DOCUMENTS

| | | |
|---|---|---|
| CN | 103476638 A | 12/2013 |
| JP | 2013-124028 A | 6/2013 |
| KR | 10-2010-0011505 A | 2/2010 |

OTHER PUBLICATIONS

International Search Report and Written Opinion for PCT/US2015/026804; mailed Jul. 27, 2015; 9 pages.

*Primary Examiner* — Toan To
(74) *Attorney, Agent, or Firm* — Gordon & Rees LLP (57) ABSTRACT

A mounting device for mounting an airbag module to a seat frame having a bottom frame and a back frame mounted to the bottom frame and having at least one side member extending in a substantially vertical direction. The mounting device includes a mounting bracket, mounted to an outside surface of the side member and connected to the airbag module, and at least one load transfer device, mounted to an inside surface of the side member and engaging a front portion or a rear portion of the side member, having a main body shaped to engage the inside surface and an engagement portion extending from the main body and shaped to engage the front portion or the rear portion. The load transfer device distributes a load, originating at the airbag module as a result of deployment or occupant loading of the airbag, from the mounting bracket to the seat frame.

20 Claims, 10 Drawing Sheets

(56) References Cited

U.S. PATENT DOCUMENTS

| | | | |
|---|---|---|---|
| 8,876,154 B2* | 11/2014 | Tracht | B60R 21/207 280/728.2 |
| 2006/0113752 A1* | 6/2006 | Tracht | B60R 21/207 280/728.2 |
| 2006/0113771 A1* | 6/2006 | Tracht | B60R 21/207 280/730.2 |
| 2006/0279074 A1* | 12/2006 | Tracht | B60R 21/215 280/730.2 |
| 2013/0187430 A1 | 7/2013 | Watanabe | |
| 2014/0015231 A1 | 1/2014 | Hayashi et al. | |
| 2014/0225352 A1* | 8/2014 | Awata | B60R 21/207 280/728.2 |
| 2015/0076802 A1* | 3/2015 | Tanabe | B60N 2/68 280/730.2 |
| 2015/0336528 A1* | 11/2015 | Tanabe | B60R 21/207 280/728.2 |

* cited by examiner

MOUNTING DEVICE FOR AN AIRBAG MODULE

CROSS REFERENCE TO RELATED APPLICATIONS

This application claims priority to and the benefit of U.S. Provisional Patent Application No. 61/982,591, filed Apr. 22, 2014. The foregoing provisional application is incorporated by reference herein in its entirety.

BACKGROUND

The present application relates generally to the field of airbags and occupant protection systems. More specifically, the application relates to a mounting device for mounting an airbag module, such as a side impact airbag module, to a seat frame member.

Side impact airbag devices may be provided in vehicle seats, such as the front seats of the vehicle. Side impact airbag devices or modules may be mounted on either the outboard or inboard (i.e., center) side of the vehicle seat. The center side impact airbag is configured to deploy away from the seat to dampen the displacement of the occupant in the inboard direction in the event of a vehicle side impact and to transfer the load of the occupant to the seat frame.

A mounting bracket for an airbag module typically includes a plate with threaded studs extending from the inboard side of the plate. The studs are inserted into openings in a seat frame, and a nut engages the studs on the opposite side of the seat frame from the plate. The nut is tightened down to couple the mounting bracket to the seat frame. When the airbag is deployed and the occupant travels in the inboard direction into the airbag, the lateral load caused by the occupant is transferred from the airbag, through the mounting bracket, and to the seat frame over the surface area of the bracket. The dimensions of the bracket also determine the length of the moment arm formed by the attached inflated cushion and the occupant shoulder contact point (e.g., the distance from the shoulder contact point to the front edge of the mounting bracket). This moment arm affects the restraint capacity of the airbag. The bracket is also configured to withstand the forces generated during the deployment of the airbag when the inflator inflates the cushion at a rapid rate.

However, the clamping load that couples the bracket to the seat frame and withstands the force of the deployment of the airbag is limited by the size of the studs and nuts used to couple the bracket to the seat frame. The load is therefore not distributed over a large area and places excessive stress on a local portion of the seat frame adjacent the nut. Further, the bracket engages the seat frame with a relatively small area. The size of this area is generally limited by the size and configuration of the seat frame, as increasing the area of the bracket may interfere with other functionalities of the seat.

Modern vehicle seat frames may be designed to minimize weight and cost by decreasing material thickness, removing welds, reducing components, and optimizing seat profiles. However, such design considerations may weaken the structural integrity of the vehicle seat. Thus, there is a need for improved load distribution from the airbag to the seat frame.

SUMMARY

One disclosed embodiment relates to an airbag assembly for a seat frame having a bottom frame configured to support a seat bottom and a back frame mounted to the bottom frame and configured to support a seat back, the back frame having at least one side member extending in a substantially vertical direction. The airbag assembly includes a mounting bracket mounted to an outside surface of the side member. The mounting bracket is shaped to partially cover the outside surface of the side member and extends along the length of the side member. An airbag module, including an inflator and an airbag, is mounted to the mounting bracket. At least one load transfer device is mounted to an inside surface of the side member and engages a front portion or a rear portion of the side member, such that the load transfer device distributes a load, originating at the airbag module as a result of deployment of the airbag or occupant loading of the airbag, from the mounting bracket to the seat frame to at least one of the inside surface, the front portion, or the rear portion of the side member. The load transfer device includes a main body shaped to engage the inside surface of the side member, and an engagement portion extending from the main body and shaped to engage the front portion or the rear portion of the side member.

Another disclosed embodiment relates to a seat frame assembly including a seat frame having a bottom frame configured to support a seat bottom and a back frame mounted to the bottom frame and configured to support a seat back, the back frame having at least one side member extending in a substantially vertical direction. A mounting bracket is mounted to an outside surface of the side member and configured to be connected to an airbag module. The mounting bracket is shaped to partially cover the outside surface of the side member and extend along a portion of the length of the side member. At least one load transfer device is mounted to an inside surface of the side member and engages a front portion or a rear portion of the side member. The load transfer device distributes a load, originating at the airbag module as a result of deployment of the airbag or occupant loading of the airbag, from the mounting bracket to the seat frame to at least one of the inside surface, the front portion, or the rear portion of the side member. The load transfer device includes a main body shaped to engage the inside surface of the side member and an engagement portion extending from the main body, which is shaped to engage the front portion or the rear portion of the side member.

Yet another disclosed embodiment relates to a mounting device for mounting an airbag module to a seat frame having a bottom frame configured to support a seat bottom and a back frame mounted to the bottom frame and configured to support a seat back, the back frame having at least one side member extending in a substantially vertical direction. The mounting device includes a mounting bracket configured to be mounted to an outside surface of the side member and configured to be connected to the airbag module. The mounting bracket is shaped to partially cover the outside surface of the side member and extend along a portion of the length of the side member. At least one load transfer device is configured to be mounted to an inside surface the side member and engage a front portion or a rear portion of the side member. The load transfer device distributes a load, originating at the airbag module as a result of deployment of the airbag or occupant loading of the airbag, from the mounting bracket to the seat frame to at least one of the inside surface, the front portion, or the rear portion of the side member. The load transfer device includes a main body shaped to engage the inside surface of the side member and an engagement portion extending from the main body, the engagement portion shaped to engage the front portion or the rear portion of the side member.

It is to be understood that both the foregoing general description and the following detailed descriptions are exemplary and explanatory only, and not restrictive of the inventions.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 1:
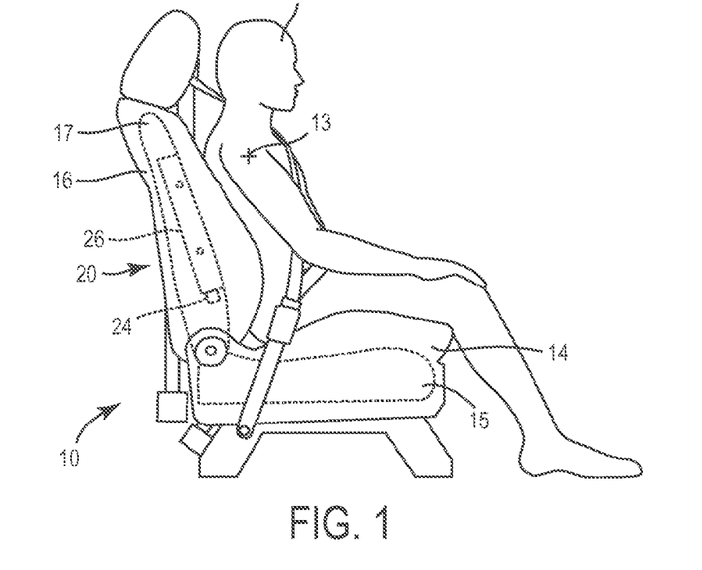
FIG. 1 is a side view of a vehicle seat including a side airbag module.

A vehicle seat with a center mounted side airbag module is shown in FIG. 1. Vehicles include one or more seats 10 that are configured to receive one or more occupants 12. The vehicle seat 10 includes a generally horizontal lower portion or seat bottom 14 that is coupled to the vehicle and an upper portion or seat back 16 that extends upward from the rear end of the seat bottom 14. The seat back 16 may be connected to the seat bottom 14 through a recliner mechanism that allows the seat back 16 to tilt or pivot relative to the seat bottom 14. Each of the seat bottom 14 and the seat back 16 includes a supporting frame 15, 17, a cushion, such as a foam pad, that is coupled to the frame 15, 17, and a trim cover that surrounds the cushion.

Figure 2A:
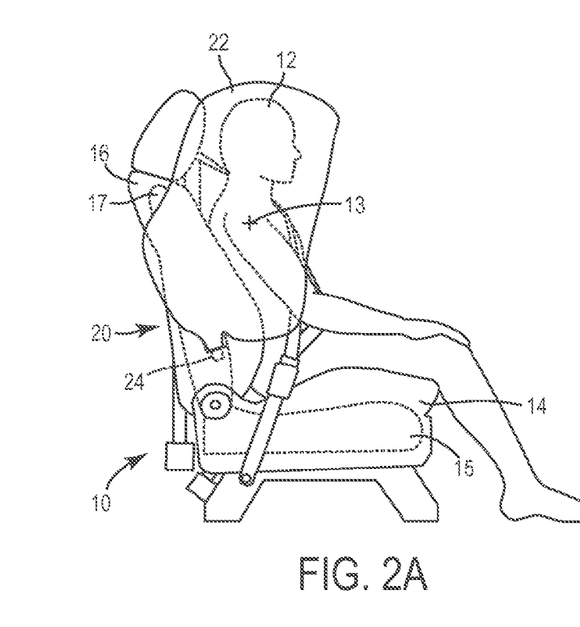
FIGS. 2A-2B are side and front views of the vehicle seat of FIG. 1 with an inflated airbag.
Figure 2B:
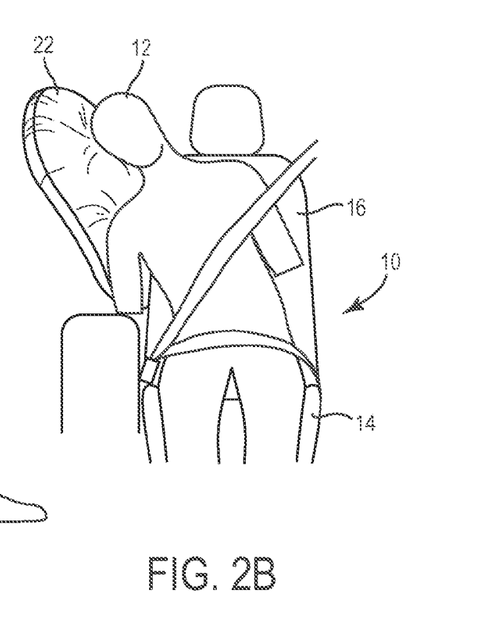

The seat may be configured to include an airbag device or module. As shown in FIGS. 1 and 2A-2B, the vehicle seat 10 includes a side airbag device 20 that is provided within the seat back 16, under the cushion and trim cover. The device 20 includes an inflatable airbag or cushion 22 and a gas generator or inflator 24 configured to generate a gas to inflate the cushion 22. The airbag module 20 is coupled to the seat back frame 17 with a mounting device 26. In a side impact, as illustrated in FIGS. 2A-2B, the cushion 22 inflates and is driven away from the seat back 16 to be positioned along the side of the upper body of the occupant 12 of the vehicle seat 10 to limit the lateral (e.g., cross-car) movement of the occupant 12. The occupant load, occurring at shoulder impact point 13, on the cushion 22 is transferred through the mounting device 26 to the seat back frame 17.

Figure 3A:
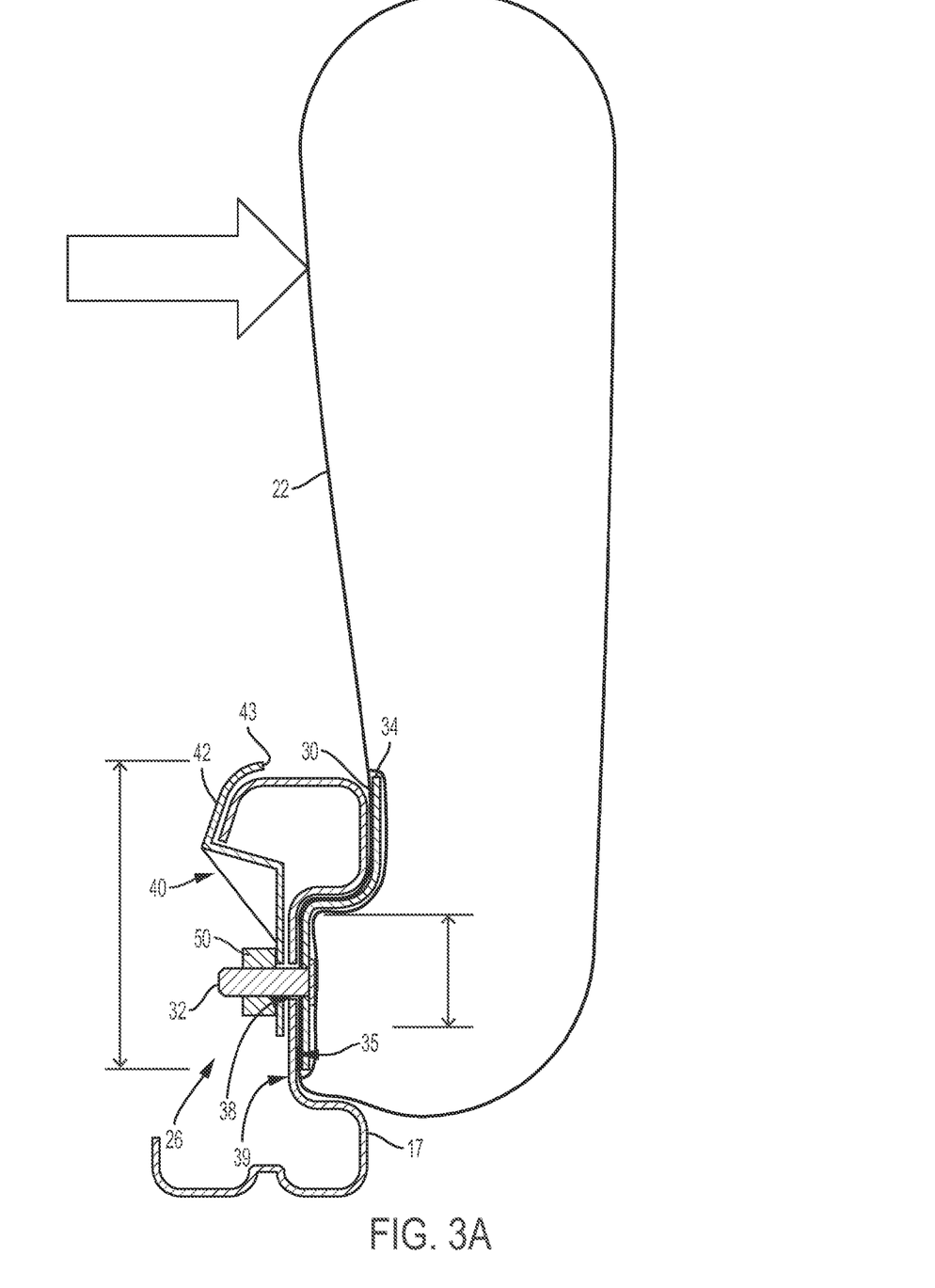
FIGS. 3A-3B are schematic views at upper and lower studs of a mounting device coupled to a side rail of a seat frame, according to an exemplary embodiment.
Figure 3B:
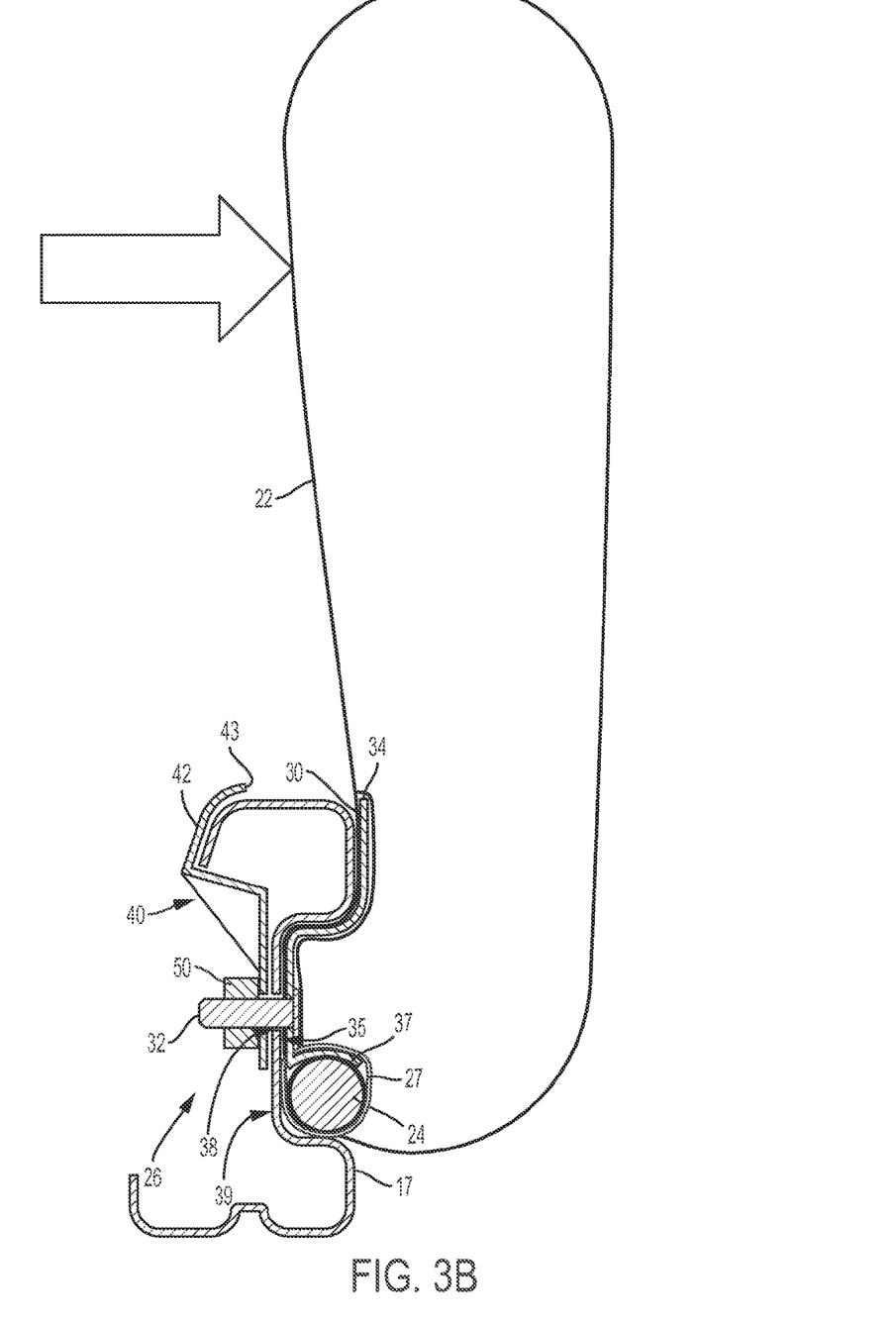
Figure 4:
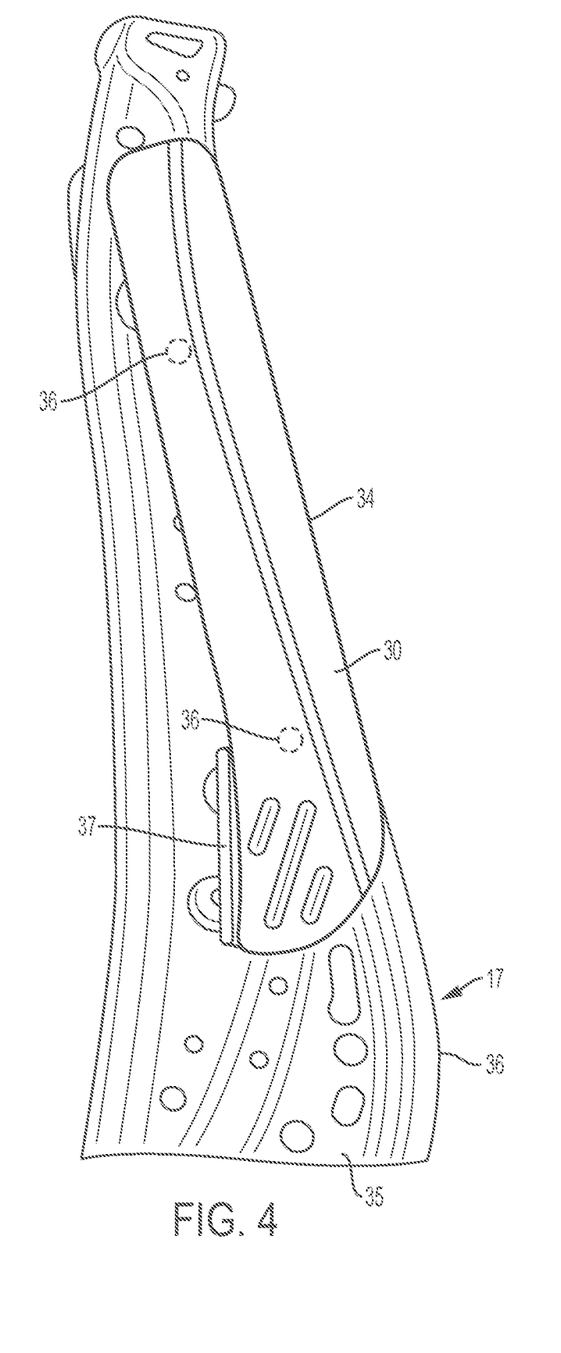
FIG. 4 is an outside view of a mounting bracket of the mounting device of FIGS. 3A-3B coupled to the seat frame.
Figure 5:
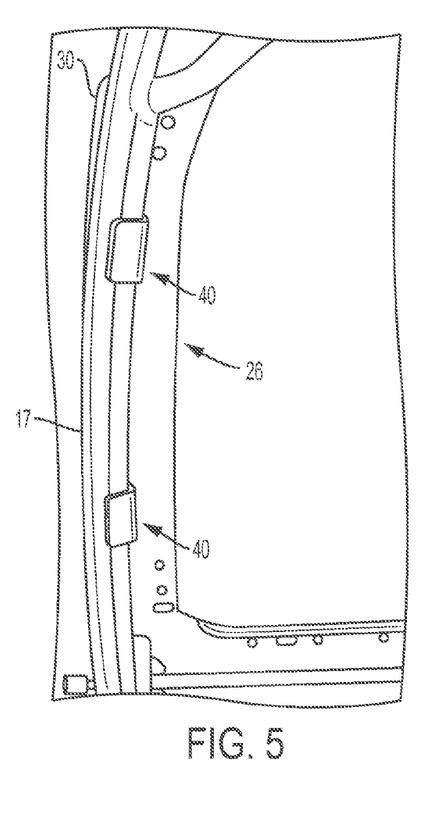
FIG. 5 is a front view of the mounting device of FIGS. 3A-3B.
Figure 6:
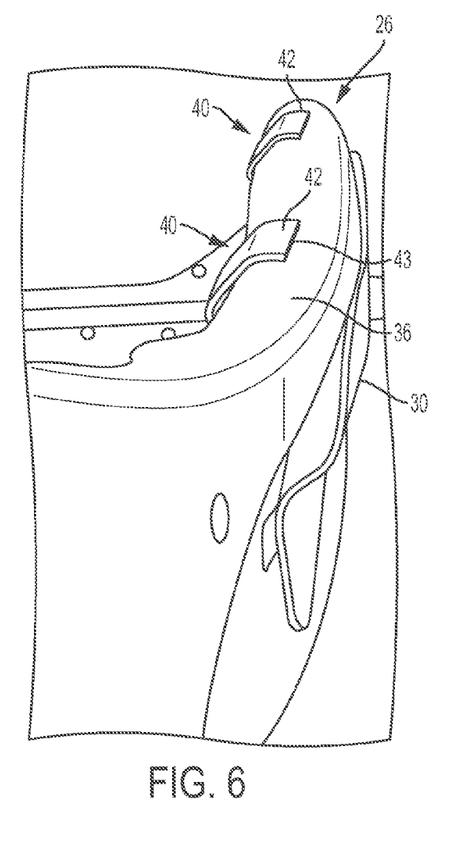
FIG. 6 is a top view of the mounting device of FIGS. 3A-3B.
Figure 7:
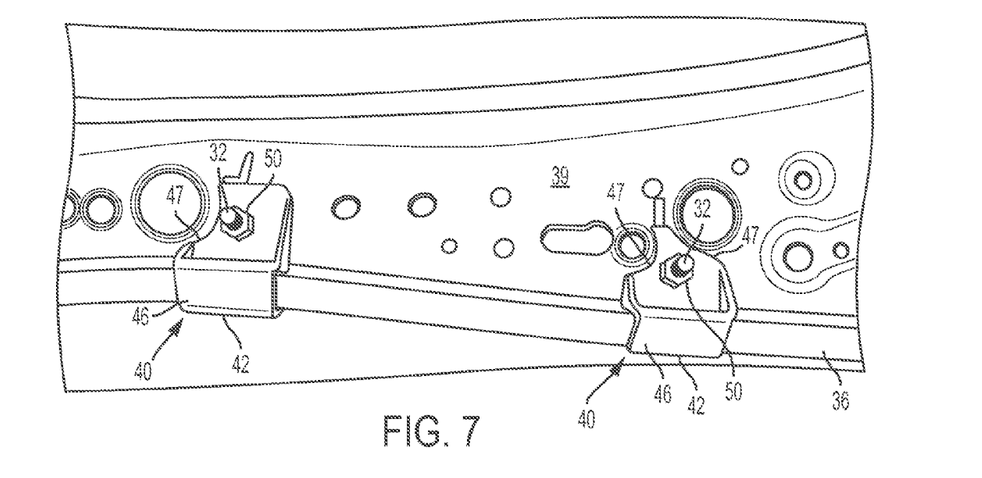
FIG. 7 is an inside view of the mounting device of FIGS. 3A-3B.
Figure 8:
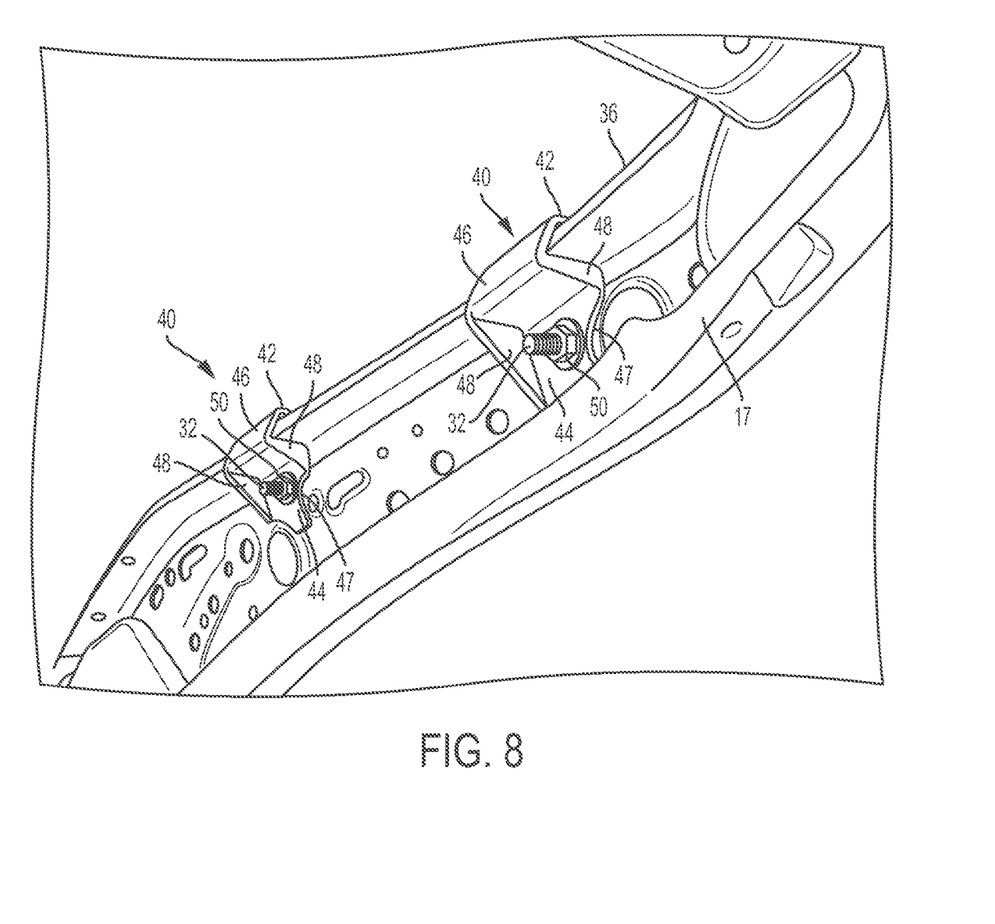
FIG. 8 is a perspective view of the inside surface of the mounting device coupled to the seat frame of FIGS. 3A-3B.

As shown in FIGS. 3A-8, the mounting device 26 includes a mounting bracket 30 and at least one load transfer device 40, each coupled to a side rail of the seat back frame 17. The bracket 30 includes one or more threaded studs 32 that extend through openings 38 of the seat back frame 17 to mount the bracket 30 to an outside surface 35 of the seat back frame 17. The threaded studs 32 may be any appropriate fastener to mount the bracket 30 to the seat back frame 17, such as press studs, weld studs, or bolts. As illustrated in FIGS. 4-6, the bracket 30 is shaped to match the shape of an outside surface 35 of the side rail of the seat back frame 17. The bracket 30 has a cross-sectional shape configured to maximize the contact surface area between the bracket 30 and the side rail. Moreover, the bracket 30 has a front edge 34 that extends a minimal distance beyond the front edge 36 of the side rail so as to be substantially flush with the front edge 36 for maximum occupant comfort. As shown in FIG. 3B, the bracket 30 is at least partially inserted into a stitched pocket contained in the cushion 22. The bracket 30 may also include a cradle 37, which may be integrally formed into the bracket 30 or attached as a separate component. The cradle 37 may be shaped to hold an inflator 24, which may be fixed to the cradle 37 by one or more clamps 27. The inflator 24 is inserted into a chamber of the cushion 22 in order to inflate the cushion 22 with gas.

As shown in FIGS. 5-8, the mounting device 26 further includes one or more load transfer devices 40 provided on an inside surface 39 of the side rail of the seat back frame 17. The load transfer devices 40 are small brackets with features that are configured to interact with the inside surface 39 and the front edge 36 of the side rail to more effectively transfer the load from the cushion 22 to the seat back frame 17. The transfer devices 40 are inserted over the studs 32 on the inside surface 39 of the side rail and engage the front edge 36 of the side rail of the seat back frame 17. Nuts 50 are threaded onto the studs 32 and are tightened down to exert a clamp load on the frame 17 between the bracket 30 and the transfer devices 40, coupling the mounting device 26 to the frame 17.

As shown in FIG. 3A, the transfer device 40 increases the distributed area of the clamp load on the frame 17 by extending along the area in which the transfer device 40 engages the inside surface 39 of the side rail (shown by the double-sided arrow to the right of the transfer device 40). By distributing the clamp load over a larger area than in a mounting system using only nuts, the stress concentration placed on the seat frame 17 around the opening 38 through which the studs 32 pass is reduced. In addition, the transfer device 40 increases the section modulus of the interface between the mounting device 26 and the side rail by extending the area in which the bracket 30 engages the seat frame 17 to the front edge 36 of the seat frame 17 (shown by the double-sided arrow to the left of the transfer device 40), thereby increasing the restraint capacity or load transfer capacity of the cushion 22 and airbag module 20. In other words, the load transfer device 40 helps to further distribute the load transferred from the mounting bracket 30 to the seat frame 17 to not only the outside surface 35 and rear portion of the seat frame 17, but also to the inside surface 39 and front edge 36 of the seat frame 17.

For a center mounted side impact airbag module, the increased restraint capacity of the cushion 22 resulting from use of the mounting device 26 helps to reduce the lateral movement or excursion of the occupant 12 towards the middle of the vehicle in a side impact (shown as the arrow in FIGS. 3A and 3B). For example, with use of the mounting device 26, a shoulder excursion (i.e. the distance the shoulder is allowed to travel past the leading edge of the vehicle's center console in a side impact) of the occupant 12 may be reduced compared to a mounting device lacking the transfer device 40. In addition, the occupant's head travel (i.e. the distance the center of gravity of an occupant's head travels past a set shoulder excursion in a side impact) may be reduced compared to a mounting device lacking the transfer device 40.

Figure 9:
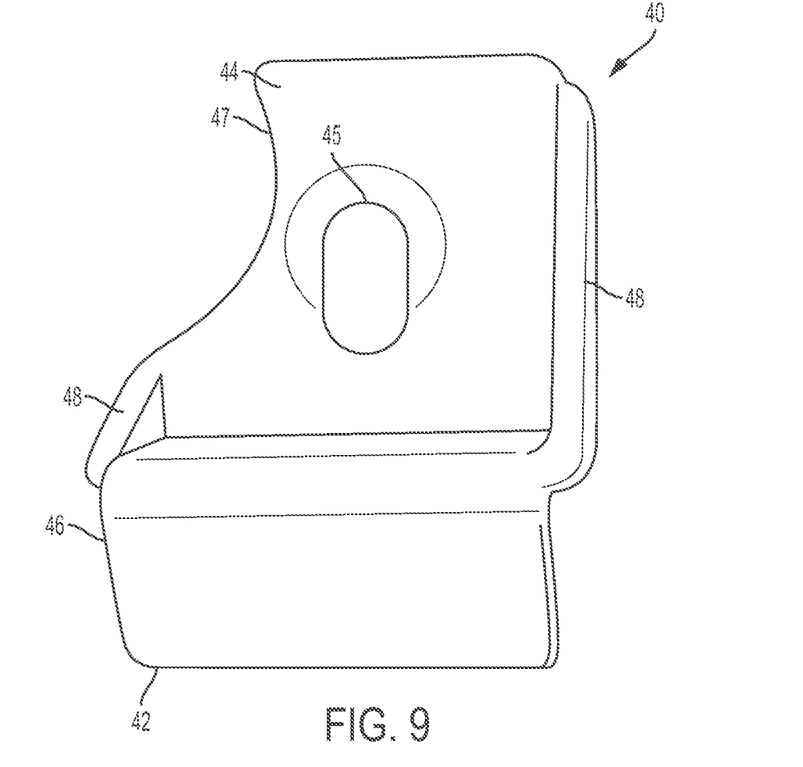
FIG. 9 is a side view of a load transfer device of the mounting device of FIGS. 3A-3B.
Figure 10:
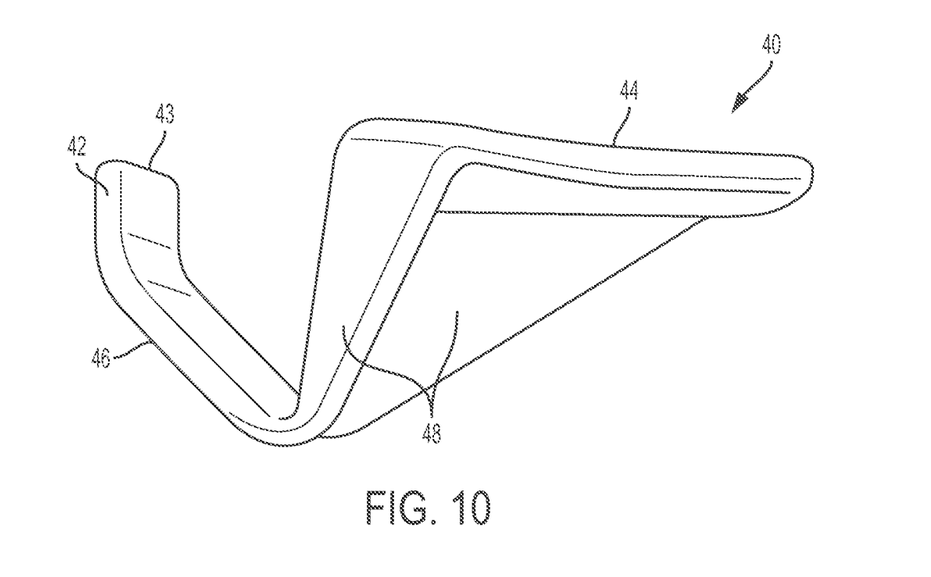
FIG. 10 is a perspective view of the load transfer device of FIGS. 3A-3B.

As illustrated in FIGS. 9-10, the transfer device 40 includes a main body 44 formed with an opening 45, which is configured to receive one of the threaded studs 32 of the bracket 30. The main body 44 may include cutouts, grooves, or other features 47 that accommodate the contours of the inside surface 39 of the seat frame 17 or may be shaped to provide clearance for other systems coupled to the seat frame (e.g., wiring harnesses, etc.). Extending from the main body 44 is an engagement feature 42, which includes a flange 46. The main body 44 may be further connected to the flange 46 by a pair of reinforcing gussets 48, which provide further structural support and rigidity to the transfer device 40. The engagement feature 42 is configured to engage (e.g., hook onto, clip onto, be fastened to, etc.) the front edge 36 of the side rail of the seat back frame 17. As shown in FIGS. 5-8, the engagement feature 42 may be a bent hook that is secured to the inside surface 39 and front edge 36 of the side rail when the mounting device 26 is coupled to the side rail. The transfer device 40 may also be configured to have a low profile that closely follows the contour of the side rail. For example, as shown in FIGS. 3A and 3B, the engagement feature 42 may be configured such that a front edge 43 does not protrude substantially outward past the front edge 36 of the side rail, so as to reduce discomfort for the occupant of the seat.

Figure 11:
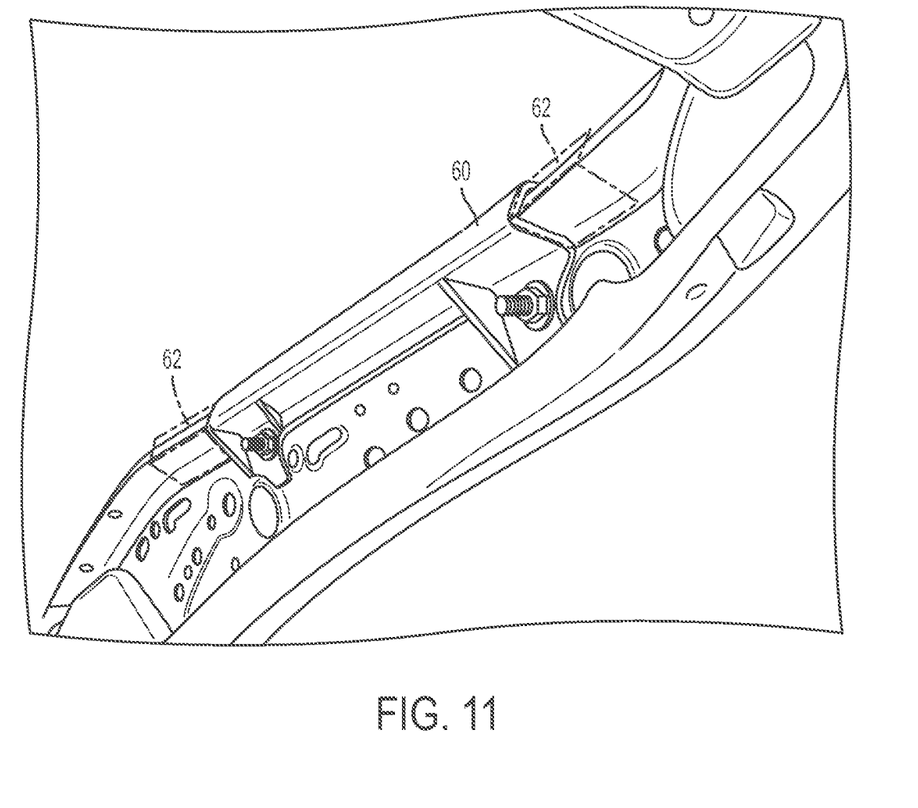
FIG. 11 is a perspective view of a load transfer device according to another exemplary embodiment.

The transfer devices 40 may be separate elements (e.g., bodies) from the bracket 30 and each may be shaped and provided independently to allow the mounting device 26 to be adapted to accommodate a variety of seat frames. This allows for the side airbag module to be mounted to a variety of different seat frames without requiring the seat frame to include integrally formed mounting features (e.g., bosses, flanges, etc.) by providing different transfer devices configured to interact with the seat frame. Alternatively, the engagement portion 42 may be integrally connected to the bracket 30 at the front edge 36 of the side rail of the frame 17. In addition, the mounting device 26 may include two independent transfer devices 40, as shown in FIGS. 5-8, with each transfer device 40 engaging a separate threaded stud 32. Alternatively, the mounting device 26 may include only a single transfer device 40 that engages only one of the studs 32 (e.g., the upper stud, the lower stud, etc.). As shown in FIG. 11, the mounting device may alternatively include a single transfer device 60 that engages two or more threaded studs and engages the inside surface and front edge of the side rail along a portion of the length of the side rail. As further shown in FIG. 11, the transfer device 60 may also include an extension 62 that extends a distance away from the threaded stud in a direction along the inside surface and front edge of the side rail. The extension 62 may be configured to support an "unsupported" portion of the bracket 30 (e.g., a portion of the bracket extending upward beyond the upper stud or downward beyond the lower stud) by engaging the inside surface and front edge of the side rail. The extension 62 may alternatively be added to support one or both "unsupported" portions of the bracket 30 and may be added to transfer devices 40 which engage only one of the studs 32.

The transfer devices 40 may be configured to accommodate seat frames with openings in a variety of locations. Coupling the bracket 30 to the seat frame 17 using openings in some locations (e.g., openings far apart from one another, openings along the extreme rear edge or front edge of the bracket, etc.) can greatly decrease the load-bearing capacity of a bracket 30 alone (e.g., a bracket coupled to the side rail with only nuts), such as by decreasing the section modulus created by the nut 50 and the seat frame 17 cross section. The use of the transfer devices 40 reduces the effect of the location of the openings 38 and increases the amount of force that is transferred from the cushion 22 through the mounting device 26 to be absorbed by the seat frame 17.

Figure 12A:
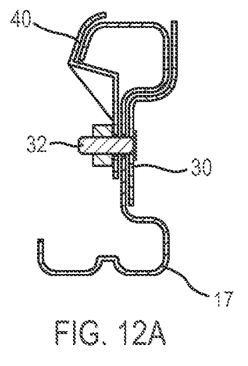
FIGS. 12A-12H and FIGS. 12J-12Q are schematic views of additional exemplary embodiments of the mounting device.
Figure 12B:
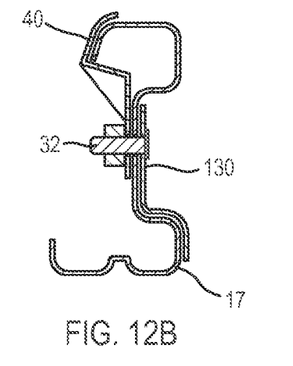
Figure 12C:
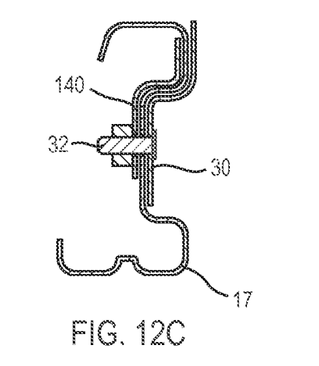
Figure 12D:
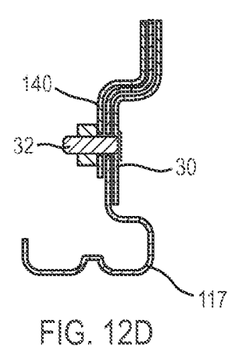
Figure 12E:
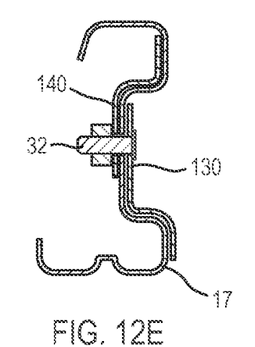
Figure 12F:
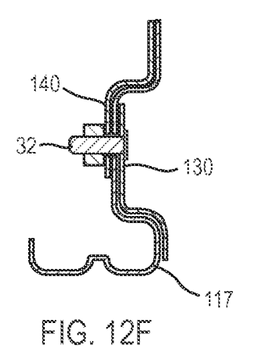
Figure 12G:
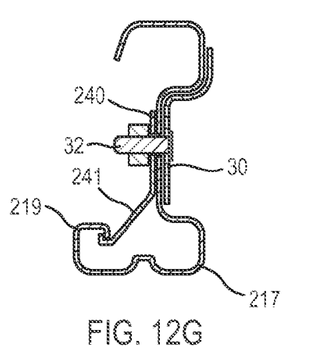
Figure 12H:
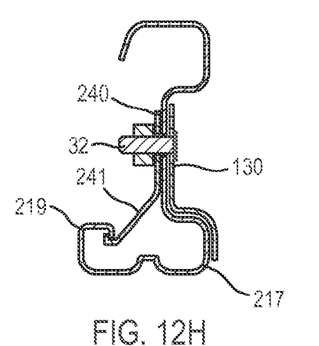
Figure 12J:
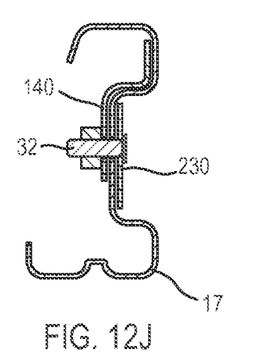
Figure 12K:
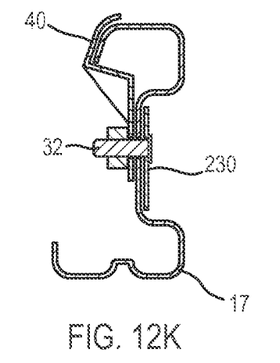
Figure 12L:
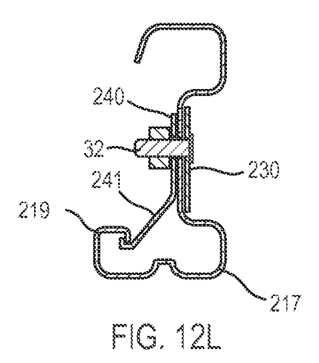
Figure 12M:
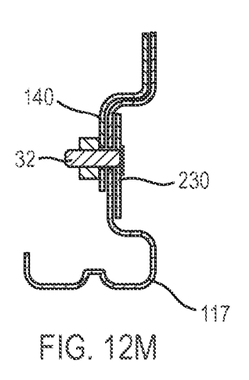
Figure 12N:
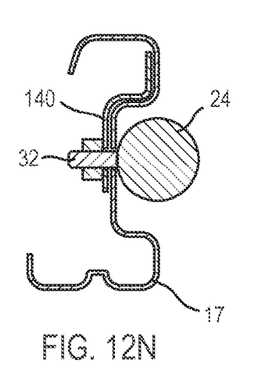
Figure 12O:
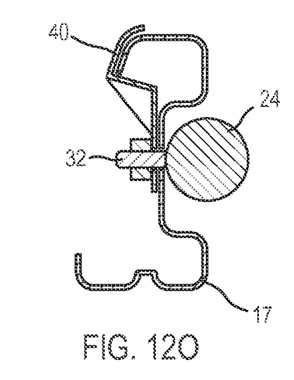
Figure 12P:
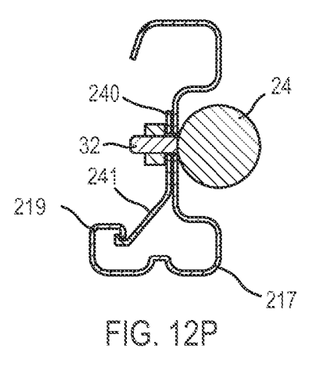
Figure 12Q:
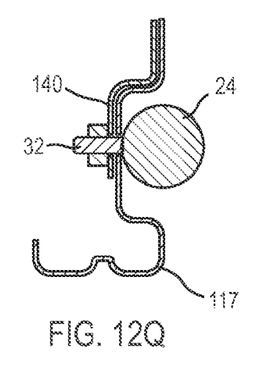

As shown in FIGS. 12A-12H and FIGS. 12J-12Q, a number of combinations of transfer devices, seat frames, and mounting brackets may be used to effectively distribute the load from the mounting bracket to the seat frame over a greater area and to additional, and preferably structurally stronger, portions of the seat frame. For example, as shown in FIG. 12B, a mounting bracket 130 that engages a rear portion of the outside surface of the seat frame may be used in conjunction with the transfer device 40 and seat frame 17. As shown in FIG. 12C, a load transfer device 140 that engages a front portion of the inside surface of the seat frame may be used in conjunction with the mounting bracket 30 and seat frame 17. Alternatively, a seat frame 117 that does not include a curved front surface may be used with a transfer device 140 and mounting bracket 30, as shown in FIG. 12D. The transfer device 140, seat frame 117, and mounting bracket 130 may be combined into additional configurations as shown in FIGS. 12E and 12F. In addition, a seat frame 217 may include a hook-like rear portion 219 that engages a transfer device 240, which may include a hook-like extension 241 that projects out from the inside surface and toward the rear of the seat frame 217 to engage the hook-like rear portion 219 of the seat frame 217. The seat frame 217 and the transfer device 240 may be used in combination with either mounting bracket 30 or 130, as illustrated in FIGS. 12G and 12H. A mounting bracket 230 also may be alternatively shaped as a flat, elongated plate that engages a flat portion of the outside surface of the seat frame. The mounting bracket 230 may be used in combination with transfer devices 40, 140, or 240, and seat frames 17, 117, or 217, as shown in FIGS. 12J-12M. Lastly, the inflator 24 may serve as the mounting bracket and be directly mounted onto the outside surface of the seat frame via studs 32. This configuration may be combined with transfer devices 40, 140, or 240, and seat frames 17, 117, or 217, as shown in FIGS. 12N-12Q.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature.

It is important to note that the construction and arrangement of the seat frame load transfer device as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

What is claimed is:

1. An airbag assembly for a seat frame for a vehicle, the seat frame having a bottom frame configured to support a seat bottom and a back frame mounted to the bottom frame and configured to support a seat back, the back frame having at least one side member extending in a substantially vertical direction, comprising:
 a mounting bracket mounted to an outside surface of the side member, wherein the mounting bracket is shaped to partially cover the outside surface of the side member and extends along the length of the side member; and
 an airbag module mounted to the mounting bracket, the airbag module including an inflator and an airbag;
 at least one load transfer device mounted to an inside surface of the side member and engaging a front portion or a rear portion of the side member, wherein the load transfer device distributes a load from the mounting bracket to the seat frame to at least one of the inside surface, the front portion, or the rear portion of the side member, the load originating at the airbag module as a result of deployment of the airbag or occupant loading of the airbag,
 the load transfer device having:
  a main body shaped to engage the inside surface of the side member; and
  an engagement portion extending from the main body, the engagement portion shaped to engage the front portion or the rear portion of the side member.

2. The airbag assembly of claim 1, wherein a front edge of the mounting bracket is substantially flush with a front edge of the side member.

3. The airbag assembly of claim 1, wherein the engagement portion engages the front portion of the side member and wherein a front edge of the engagement portion is substantially flush with a front edge of the side member.

4. The airbag assembly of claim 1, wherein the mounting bracket is an inflator having a mounting feature configured to extend through the side member to engage the load transfer device.

5. The airbag assembly of claim 1, wherein the main body is fastened to the inside surface of the side member.

6. The airbag assembly of claim 5, wherein the load transfer device extends along a portion of the length of the side member, and wherein the main body is fastened at an upper end portion and a lower end portion of the main body to the inside surface of the side member.

7. The airbag assembly of claim 6, wherein the length of the load transfer device is substantially equal to the length of the mounting bracket.

8. The airbag assembly of claim 1, wherein the load transfer device is mounted to an upper portion of the side member.

9. The airbag assembly of claim 1, wherein the load transfer device is mounted to a lower portion of the side member.

10. The airbag assembly of claim 1, wherein an upper edge of the engagement portion is aligned with an upper edge of the mounting bracket.

11. The airbag assembly of claim 1, wherein a lower edge of the engagement portion is aligned with a lower edge of the mounting bracket.

12. The airbag assembly of claim 1, wherein at least two load transfer devices are mounted to the inside surface of the side member.

13. The airbag assembly of claim 12, wherein the first load transfer device is mounted to an upper portion of the side member and the second load transfer device is mounted to a lower portion of the inside surface of the side member.

14. The airbag assembly of claim 13, wherein an extension engaging a portion of the inside surface and a portion of the front portion of the side member extends along a portion of the length of the side member and connects the first load transfer device to the second load transfer device.

15. The airbag assembly of claim 1, wherein the main body has a first leg and a second leg, the first leg and the second leg being connected in a substantially L-shape.

16. The airbag assembly of claim 15, wherein the load transfer device has at least one angled rib connecting from the first leg to the second leg.

17. The airbag assembly of claim 1, wherein the inside surface of the side member is contoured, and wherein the main body has cutouts shaped to form around the contours such that the contours protrude through the cutouts.

18. The airbag assembly of claim 1, wherein the engagement portion of the load transfer device is integrally connected to the mounting bracket.

19. A seat frame assembly for a vehicle, comprising:
 a seat frame having a bottom frame configured to support a seat bottom and a back frame mounted to the bottom frame and configured to support a seat back, the back frame having at least one side member extending in a substantially vertical direction;
 a mounting bracket mounted to an outside surface of the side member and configured to be connected to an airbag module, wherein the mounting bracket is shaped to partially cover the outside surface of the side member and extend along a portion of the length of the side member; and
 at least one load transfer device mounted to an inside surface of the side member and engaging a front portion or a rear portion of the side member, wherein the load transfer device distributes a load from the mounting bracket to the seat frame to at least one of the inside surface, the front portion, or the rear portion of the side member, the load originating at the airbag module as a result of deployment of the airbag or occupant loading of the airbag,
 the load transfer device having:
  a main body shaped to engage the inside surface of the side member; and
  an engagement portion extending from the main body, the engagement portion shaped to engage the front portion or the rear portion of the side member.

20. A mounting device for mounting an airbag module to a seat frame for a vehicle, the seat frame having a bottom frame configured to support a seat bottom and a back frame mounted to the bottom frame and configured to support a seat back, the back frame having at least one side member extending in a substantially vertical direction, comprising:
 a mounting bracket configured to be mounted to an outside surface of the side member and configured to be connected to the airbag module, wherein the mounting bracket is shaped to partially cover the outside surface of the side member and extend along a portion of the length of the side member; and at least one load transfer device configured to be mounted to an inside surface the side member and engage a front portion or a rear portion of the side member, wherein the load transfer device distributes a load from the mounting bracket to the seat frame to at least one of the inside surface, the front portion, or the rear portion of the side member, the load originating at the airbag module as a result of deployment of the airbag or occupant loading of the airbag, the load transfer device having:
- a main body shaped to engage the inside surface of the side member; and
- an engagement portion extending from the main body, the engagement portion shaped to engage the front portion or the rear portion of the side member.

* * * * *